United States Patent [19]

Kaminsky

[11] 4,452,553
[45] Jun. 5, 1984

[54] ADJUSTING DRIVE FOR THE CUTTING EDGE OF A TOOL

[75] Inventor: Theo Kaminsky, Pfungstadt, Fed. Rep. of Germany

[73] Assignee: Santrade Ltd., Lucerne, Switzerland

[21] Appl. No.: 300,067

[22] Filed: Sep. 8, 1981

[30] Foreign Application Priority Data

Sep. 11, 1980 [DE] Fed. Rep. of Germany ....... 3034210

[51] Int. Cl.$^3$ ................ B23B 39/00; B23B 41/00; F16H 25/20; F16H 37/12
[52] U.S. Cl. .................................. 408/162; 74/89.15; 74/665 L; 82/1.2; 82/1.4; 408/153
[58] Field of Search ............... 408/158, 153, 162, 129, 408/132, 133; 409/233, 185; 74/89.15, 665 L; 82/1.2, 1.4

[56] References Cited

U.S. PATENT DOCUMENTS

| | | | |
|---|---|---|---|
| 1,052,767 | 2/1913 | Teague | 408/129 |
| 1,884,605 | 10/1932 | Dina | 74/665 L |
| 3,293,951 | 12/1966 | Lauterwasser | 408/153 X |
| 3,613,464 | 10/1971 | Archer | 74/89.15 |
| 3,640,138 | 2/1972 | Hahn et al. | 74/89.15 |
| 4,250,775 | 2/1981 | Jerue et al. | 82/1.2 |
| 4,358,228 | 11/1982 | Stark | 408/129 X |

FOREIGN PATENT DOCUMENTS

| | | | |
|---|---|---|---|
| 141104 | 3/1935 | Austria | 408/158 |
| 2405694 | 8/1975 | Fed. Rep. of Germany | 408/158 |
| 2327840 | 5/1977 | France | . |

Primary Examiner—Francis S. Husar
Assistant Examiner—Steven B. Katz
Attorney, Agent, or Firm—Burns, Doane, Swecker & Mathis

[57] ABSTRACT

A tool has independently radially adjustable cutting edges. Adjusting drives are provided for each cutting edge. Each adjusting drive is laterally spaced from, and axially overlaps, an adjacent adjusting drive. Each adjusting drive comprises a servomotor which directly drives a screw. A screw nut is axially movable on the screw and is rigidly connected by means of a bridge with an adjusting piston arranged parallel thereto. The adjusting piston is axially movable and is connected by a bearing to a tubular connecting rod. Axial movement of the latter serves to radially adjust an associated cutting edge of the tool. The connecting rods of the adjusting drives are coaxially and telescopingly arranged.

4 Claims, 3 Drawing Figures

ADJUSTING DRIVE FOR THE CUTTING EDGE OF A TOOL

BACKGROUND AND OBJECTS OF THE INVENTION

The invention concerns an adjusting drive for radially adjusting the cutting edge of a tool.

Radial adjustment of the cutting edge of tools serves to compensate for the wear of the cutting edge and to lift the cutting edge from the surface of the workpiece being machined at the end of a machining process, prior to the onset of the return motion of the tool. In a tool of this type, the cutting edge is radially displaceable in the body of the tool by means of a connecting rod. The latter is axially movable in a rotatingly driven tool spindle. A rotatable adjusting piston is axially displaceable in the housing of the adjusting drive and connected by means of an axial bearing with the connecting rod, and with a servomotor arranged in an axially parallel manner with respect to the connecting rod. The output shaft of said servomotor is connected with the adjusting piston by means of a screw and a spindle screw nut.

In order to obtain a degree of adjustability of the cutting edge, the tool equipped with the edge, for example a boring bit, may be mounted on a swiveling and/or elastically deformable part of the body of the tool. The conversion of the axial motion of the connecting rod into the radial motion of the cutting edge takes place in most cases by means of an inclined surface provided on the connecting rod, which supports the moving part of the tool body as disclosed in German OS No. 24 05 694, the disclosure of which is hereby incorporated by reference herein.

If several cutting edges are arranged in one tool body, it is desirable to have all or at least several cutting edges adjustable, as it is not rational to extend only the life of a single cutting edge by compensating for tool wear, since the overall life of the tool is determined by the uncompensated wear of another cutting edge of the tool.

However, the use of several, coaxially arranged connecting rods is difficult, because a separate adjusting drive must be provided for each of the connecting rods. It is known from French Pat. No. 2,327,840 to provide a hollow screw in an adjusting drive of the aforementioned type, so that one or several connecting rods may be arranged coaxially and each connected with a separate adjusting drive arranged therebehind.

Because of the relatively great structural length of the known adjusting drive, the overall length of several adjusting drives arranged axially following each other would be excessively large. This would create particular difficulties for the innermost and therefore thinnest and longest connecting rod.

In the known adjusting drive, the screw nut surrounding the hollow screw is located within the axial bearing supporting the screw nut, which therefore must have a relatively large diameter. The threaded nut arranged coaxially with respect to the connecting rod is effected by means of the servomotor through a bevel gear drive, the servomotor being arranged in an axially parallel manner. The relatively large axial structural length of the known adjusting drive results, in particular, from the fact that (i) the spindle nut, (ii) the rotationally stationary guide of the screw and (iii) the axial bearing connecting the screw with the connecting rod, are arranged following each other in the axial direction.

It is an object of the present invention to provide an adjusting drive of the aforementioned type, having the shortest axial structural length possible. Advantageously, a plurality of such adjusting drives may be arranged following each other in succession, without excessively extending the overall structural length of the assembly.

SUMMARY OF THE INVENTION

This object is attained according to the invention in that (i) the output shaft of the servomotor is connected directly with the screw, (ii) the screw nut is located in an axially movable spindle piston and (iii) the spindle piston and the adjusting piston are laterally spaced and connected with each other by means of a bridge member.

In this arrangement, all of the elements effecting the longitudinal motion, namely (i) the servomotor, (ii) the screws with their axial bearing and (iii) the screw nut, are removed from the axis of the tool screw, wherein the connecting rods are located and arranged axially parallel to the screw axis. It is, therefore, unnecessary to provide a hollow screw. The screws and therefore also the screw nuts, may thus have relatively small diameters. There is sufficient space for the axial bearing of the screw adjacent to the screw nut. It is no longer necessary to transmit a rotational motion to a structural element aligned with the axis of the tool screw, since only an axial or longitudinal motion is being transmitted by the axially adjustable screw piston to the adjusting piston located in the axis of the tool screw. Only the axial bearing transmitting the adjusting force to the connecting rod is located within the adjusting piston. It is therefore, not difficult to provide diametrically adequate space within the adjusting piston and the axial bearing located therein for the passage of several coaxial connecting rods.

The structural length controlling the successive arrangement of several adjusting drives in a row, is determined only by the structural length of the housing part accepting the adjusting piston. The servomotor, arranged offset in an axially parallel manner with respect to the housing part, does not interfere with the placement of the successive adjusting drives, because it is located laterally outside the housing of the following adjusting drive. This reduced overall structural length results in a length even for the innermost and thus thinnest connecting rod that is not excessive, so that safety of operation is assured even for the adjusting drive to which the innermost connecting rod belongs. Even in the case of several concentric connecting rods, the innermost connecting rod may be hollow, because of the availability of an adequate diameter, so that a central supply of the cooling medium is possible in a simple manner and without special sealing elements.

In a further development of the invention, the adjusting piston and the spindle piston are preferably guided in axially parallel housing bores. The bridge member connecting the adjusting piston and the spindle piston extends through a longitudinal slit connecting the two bores in the housing. As a result, a compact structural layout and a highly rigid joining of the spindle piston and the adjusting piston are obtained.

Preferably, the bridge comprises two flange rings threadedly joined respectively with the spindle piston and the adjusting piston, and a web connecting the flange rings. This embodiment of the bridge member transmitting the thrust is especially space saving, particularly when one of the flange rings of the bridge rests axially against the screw nut and the other flange ring rests axially against the axial bearing of the adjusting piston.

THE DRAWING

The invention will become more apparent from an example of the embodiment hereinafter, shown in the drawing attached hereto, wherein:

FIG. 1 shows a longitudinal section through three adjusting drives arranged successively following each other, FIG. 2 is a cross-section taken along the line II—II in FIG. 1, and FIG. 3 is a longitudinal sectional view taken through a bore bar on which the cutting edges are mounted.

DETAILED DESCRIPTION OF A PREFERRED EMBODIMENT OF THE INVENTION

Figure 1:
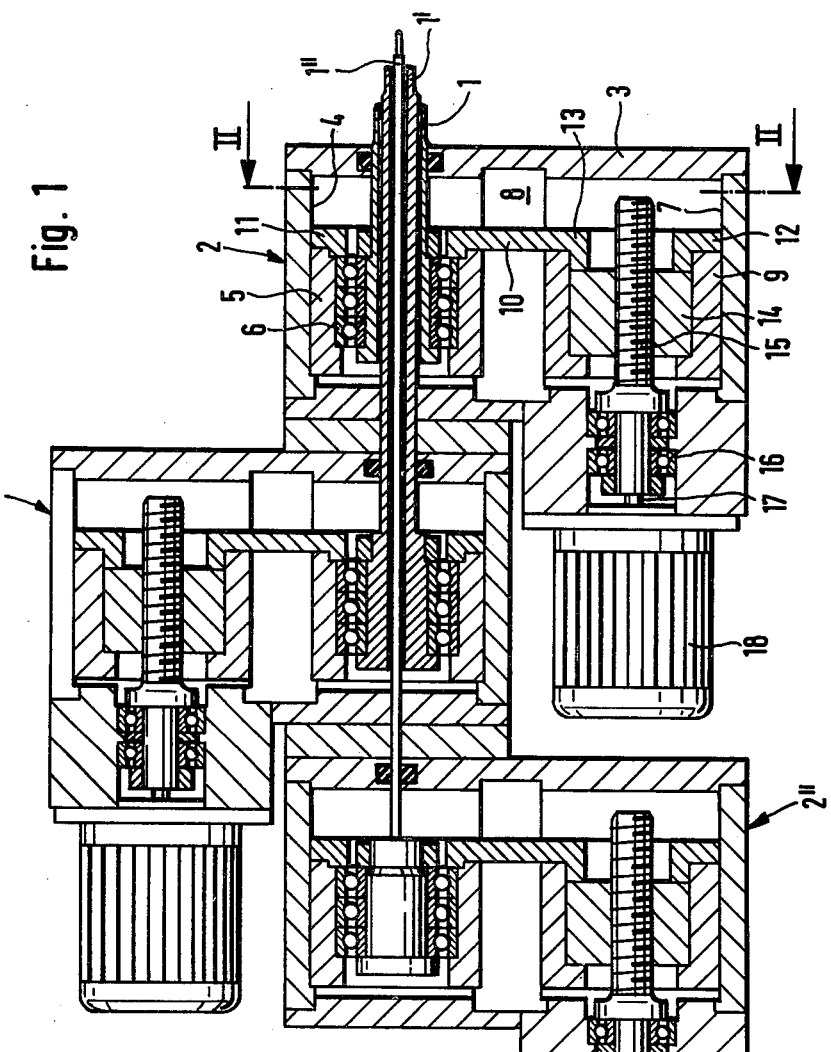
Figure 2:
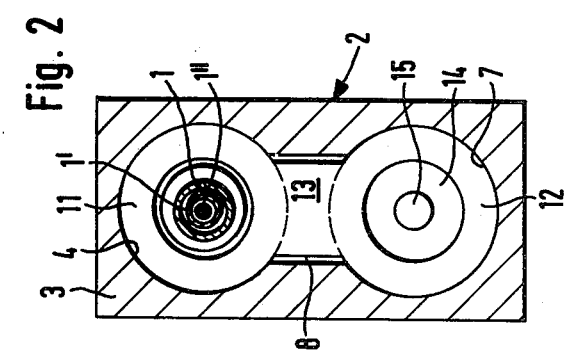
Figure 3:
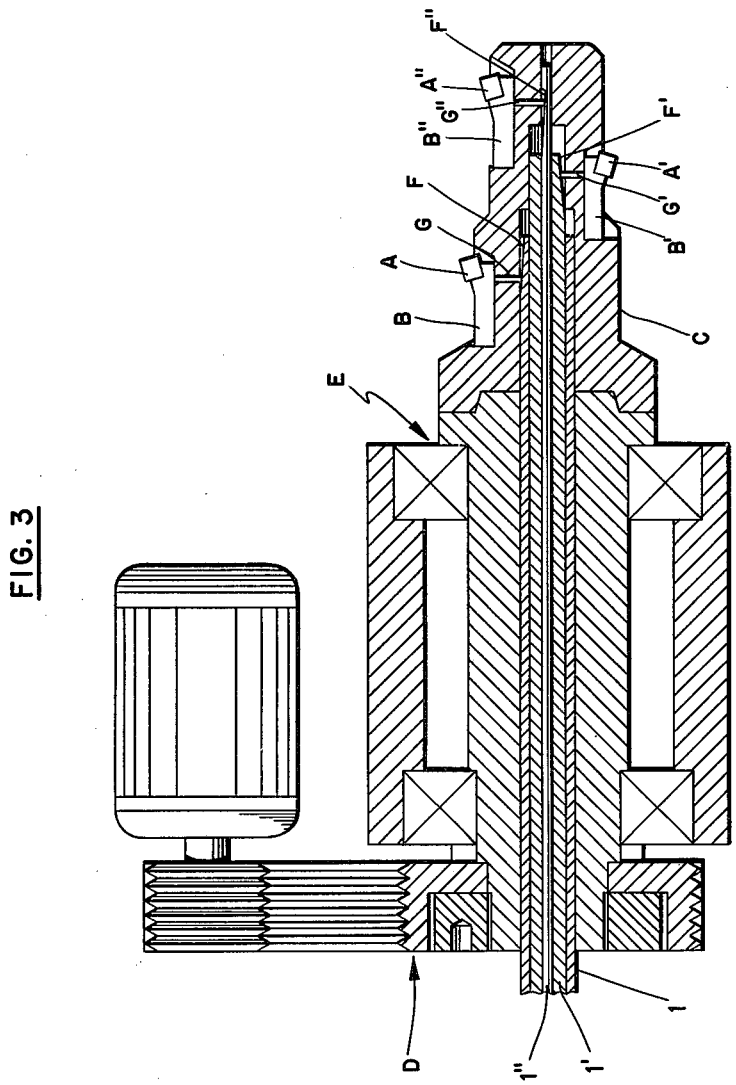

Three connecting rods 1, 1' and 1" arranged coaxially within each other serve to radially adjust three cutting edges A, A', A" each in a tool body B, B', B" of for example a boring bar C. For the radial adjustment of the cutting edges the connecting rods 1, 1' and 1", which are rotating along with the boring bar C as the latter is driven by a motor drive D while held in a boring spindle, must perform axial movements when the connecting rods 1, 1', 1" are moved axially, cam surfaces F, F', F" on those rods radially move pins G, G', G" which are connected to the tool bodies B, B', B". These axial movements are effected by three adjusting drives 2, 2', 2" which successively follow each other in a laterally spaced relationship. Since the fundamental design of each of the three adjusting drives 2, 2' and 2" are equal, only one of them shall be described in detail hereinafter.

In a housing 3 of the adjusting drive 2, an adjusting piston 5 is guided in an axially moving manner in a housing bore 4 surrounding the connecting rod 1. By way of an axial bearing 6, the adjusting piston 5 is connected with the connecting rod 1.

In a housing bore 7, arranged axially parallel to the bore 4 and connected with the latter by means of a longitudinal slit 8, a spindle piston 9 is guided in an axially moving manner. The adjusting piston 5 and the spindle piston 9 are connected with each other by means of a bridge 10. The bridge 10 comprises (i) a flange ring 11 threadedly connected with the adjusting piston 5 and holding the axial bearings 6, (ii) a flange ring 12 threadedly connected with the spindle piston 9, and (iii) a web part 13 joining the two flange rings 11, 12. The bridge 10 represents security against rotation for the adjusting piston 5 and the spindle piston 9, because both of these pistons are guided in parallel bores 4, 7. The adjusting piston 5 and spindle piston 9 are spaced laterally from each other and are axially overlapping.

A screw nut 14 is held in the spindle piston 9 by means of the flange ring 12. The screw nut is engaged by a screw 15, for example a recirculating ball spindle. The screw 15 is supported by means of axial bearings 16 in the housing 3 and is connected directly with an output shaft 17 of a servomotor 18, which for example is in the form of a stepping motor.

The flange ring 11 rests axially against the bearing 6, and the flange ring 12 rests axially against the nut 14.

During a rotating movement of the screw 15 the spindle piston 9 and the adjusting piston 5, rigidly connected with it by means of the bridge 10, are moved axially. This axial movement is transmitted by way of the axial bearings 6 to the rotating connecting rod 1.

The connecting rod 1 is in the form of a tube and surrounds the connecting rod 1', which is also in the form of a tube, wherein the connecting rod 1", in the form of a rod, is contained.

The representation in FIG. 1 shows with particular clarity the space saving arrangement of the adjusting drives 2, 2' and 2". The part of the housing 3 holding the axial bearing 16 for the screw 15 and the servomotor 18 flanged to it, are located laterally adjacent to, and axially overlapping, the housing of the adjusting drive 2', following them. A similar relationship exists between the housings of the adjusting drives 2', 2". The structural length resulting from the servomotor 18 and the screw 15 therefore does not appear as the overall length of several adjusting drives placed successively behind each other.

In this arrangement, all of the elements effecting the longitudinal motion, namely (i) the servomotor, (ii) the screws with their axial bearing and (iii) the screw nut, are removed from the axis of the tool screw, wherein the connecting rods are located and arranged axially parallel to the screw axis. It is, therefore, unnecessary to provide a hollow screw. The screws and therefore also the screw nuts, may thus have relatively small diameters. There is sufficient space for the axial bearing of the screw adjacent to the screw nut. It is no longer necessary to transmit a rotational motion to a structural element aligned with the axis of the tool screw, since only an axial or longitudinal motion is being transmitted by the axially adjustable screw piston to the adjusting piston located in the axis of the tool screw. Only the axial bearing transmitting the adjusting force to the connecting rod is located within the adjusting piston. It is therefore not difficult to provide diametrically adequate space within the adjusting piston and the axial bearing located therein for the passage of several coaxial connecting rods.

The structural length controlling the successive arrangement of several adjusting drives in a row, is determined only by the structural length of the housing part accepting the adjusting piston. The servomotor, arranged offset in an axially parallel manner with respect to the housing part, does not interefere with the placement of the successive adjusting drives, because it is located laterally outside the housing of the following adjusting drive. This reduced overall structural length results in a length even for the innermost and thus thinnest connecting rod that is not excessive, so that safety of operation is assured even for the adjusting drive to which the innermost connecting rod belongs. Even in the case of several concentric connecting rods, the innermost connecting rod may be hollow, because of the availability of an adequate diameter, so that a central supply of the cooling medium is possible in a simple manner and without special sealing elements.

Although the invention has been described in connection with a preferred embodiment thereof, it will be appreciated by those skilled in the art, that additions, modifications, substitutions, and deletions not specifically described, may be made without departing from the spirit or scope of the invention as defined in the appended claims.

What is claimed is:

1. In an adjusting drive for a tool of the type carrying a radially adjustable cutting edge, the adjusting drive being of the type comprising an axially movable connecting rod operably connected with the cutting edge so that axial movement of the connecting rod radially adjusts the cutting edge, a rotatable adjusting piston connected to the connecting rod by means of a bearing permitting relative rotation therebetween, a servomotor arranged parallel to the connecting rod and having an output shaft connected to a screw and a spindle nut mounted on said screw and connected to said adjusting piston such that rotation of the screw produces axial movement of the spindle nut and corresponding axial movement of the adjusting piston and connecting rod, the improvement wherein said output shaft is directly connected to said screw, an axial movable spindle piston receives therein said spindle nut and is disposed laterally of said adjusting piston, and a bridge member connects said spindle piston to said adjusting piston, said adjusting piston and spindle piston being guided in parallel housing bores, and said bridge member extends through a longitudinal slit connecting said two housing bores.

2. An adjusting drive according to claim 1, wherein said bridge comprises two flange rings threadedly joined respectively with said spindle piston and said adjusting piston, and a web interconnecting said flange rings.

3. An adjusting drive according to claim 2, wherein one of said flange rings rests axially against said screw nut, and that the other flange ring rests axially against said bearing.

4. In a tool of the type comprising a plurality of cutting edges independently adjustable in the radial direction, there being an adjusting drive for each cutting edge, each adjusting drive being of the type comprising an axially movable connecting rod operably connected with the cutting edge so that axial movement of the connecting rod radially adjusts the cutting edge, a rotatable adjusting piston connected to the connecting rod by means of a bearing permitting relative rotation therebetween, a servomotor arranged parallel to the connecting rod and having an output shaft connected to a screw and a spindle nut mounted on said screw and connected to said adjusting piston such that rotation of the screw produces axial movement of the spindle nut and corresponding axial movement of the adjusting piston and connecting rod, the improvement wherein said output shaft is directly connected to said screw, an axial movable spindle piston receives therein said spindle nut and is disposed laterally of said adjusting piston, and a bridge member connects said spindle piston to said adjusting piston, each adjusting drive being laterally spaced from, and axially overlapping an adjacent adjusting drive.

* * * * *